United States Patent [19]

Hertel et al.

[11] Patent Number: 5,080,852
[45] Date of Patent: Jan. 14, 1992

[54] METHOD OF MAKING A BEARING SLEEVE FOR A SPLIT SPROCKET WHEEL ASSEMBLY

[75] Inventors: Karl R. Hertel, Delafield; James H. Wiegand, Franklin, both of Wis.

[73] Assignee: Envirex Inc., Waukesha, Wis.

[21] Appl. No.: 684,602

[22] Filed: Apr. 12, 1991

Related U.S. Application Data

[60] Division of Ser. No. 551,056, Jul. 11, 1990, which is a continuation of Ser. No. 337,580, Apr. 13, 1989, abandoned.

[51] Int. Cl.$^5$ .................. B29C 39/10; B29C 39/12
[52] U.S. Cl. .................. 264/269; 264/271.1; 264/279; 264/549
[58] Field of Search .................. 264/46.9, 262, 267, 264/269, 271.1, 279, 279.1, 549; 384/297

[56] References Cited

U.S. PATENT DOCUMENTS 2,246,092  6/1941  Gilman .................. 384/297

Primary Examiner—Robert A. Dawson
Assistant Examiner—Matthew O. Savage
Attorney, Agent, or Firm—Michael, Best & Friedrich

[57] ABSTRACT

A method of making a split bearing sleeve having flanges at the opposed ends thereof for mounting a sprocket wheel on an axially extending shaft is disclosed herein. The method includes the steps of providing a mold having axially aligned recessed areas for the flanges and an intermediate area extending between the recessed areas for the flanges, placing a thin strip of polyethylene in the intermediate axially extending area such that the strip extends partially into the recessed flange areas, and pouring heated polyurethane into the mold to fill the recessed areas for the flanges and the intermediate axially extending area to encapsulate the thin strip in the recessed flange areas.

2 Claims, 2 Drawing Sheets

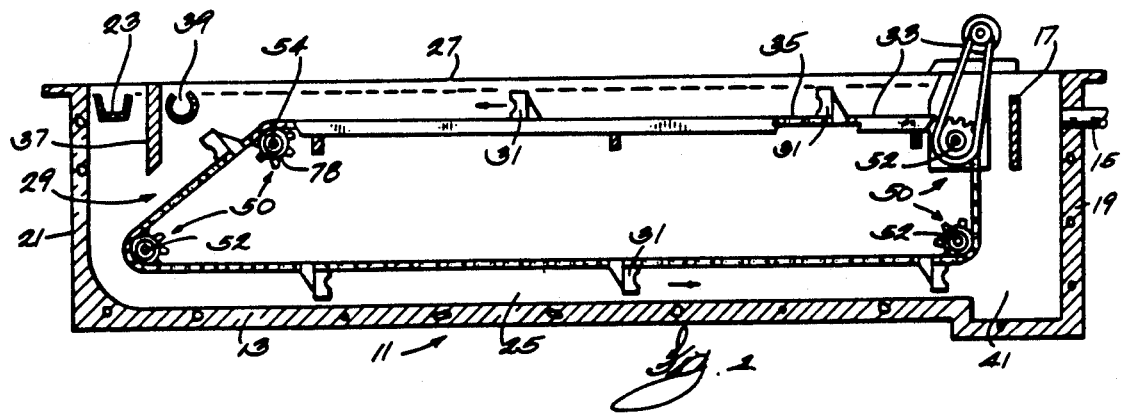
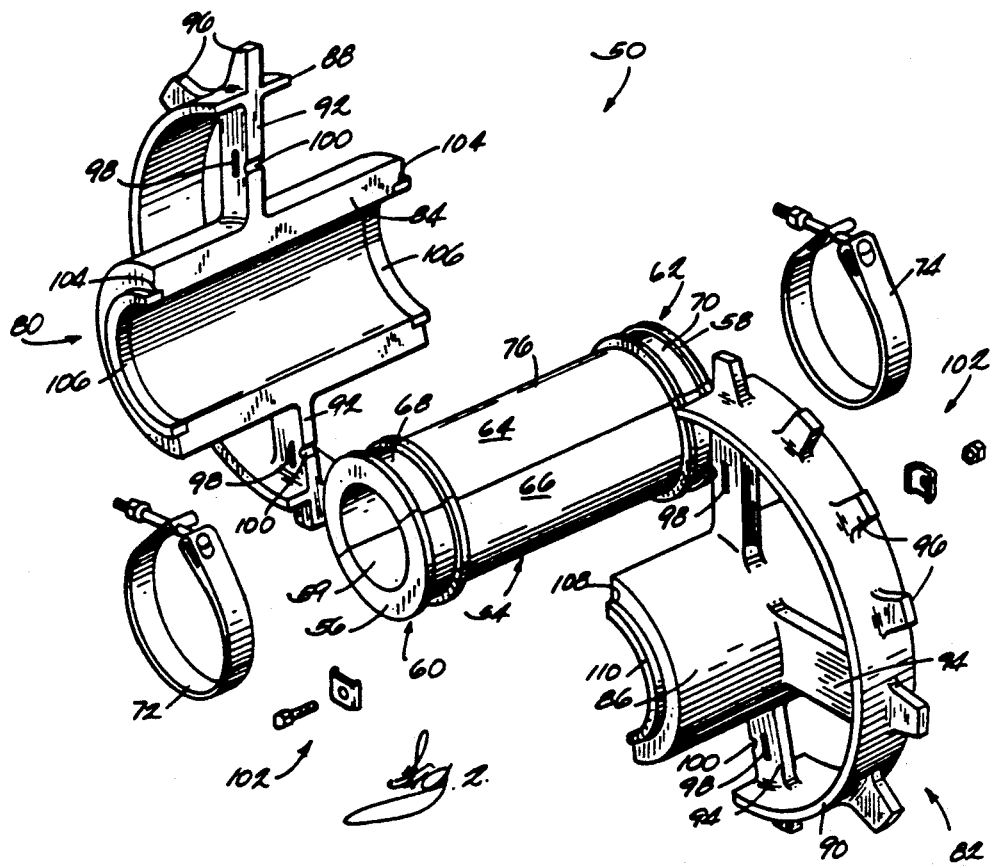

METHOD OF MAKING A BEARING SLEEVE FOR A SPLIT SPROCKET WHEEL ASSEMBLY

This is a division of co-pending application Ser. No. 07/551,056 filed July 11, 1990 which, in turn is a continuation of patent application Ser. No. 07/337,580 filed Apr. 13, 1989, entitled "REDUCED FRICTION SPOOL BEARING AND METHOD OF MAKING SAME", now abandoned.

BACKGROUND OF THE INVENTION

The invention relates generally to polymeric sprocket wheels which include sleeve bearings. More particularly, the invention relates to improvements in sprocket wheels which are intended for use in submerged, corrosive environments, such as in wastewater settling tanks.

It has been heretofore proposed to provide sprocket wheels fabricated from polymeric materials. It is also been heretofore proposed to provide polymeric sprocket wheels of split design, which can easily be installed without removal of a shaft on which the sprocket wheel is designed to be mounted. U.S. Pat. No. 4,631,974 discloses a sprocket wheel having these features.

It has also been previously proposed to provide sprocket wheels including a split sprocket sleeve adapted to be clamped to a static shaft, and also including a split sprocket portion adapted to be mounted on the sprocket sleeve for rotation relative to the sprocket sleeve about the shaft. Attention is directed to Envirex Inc. Bulletin 315-94, which discloses a sprocket wheel including a sprocket sleeve. Other references relating to bearings and surfaces adapted to slidingly contact other surfaces include the Reuter et al. U.S. Pat. No. 2,951,053; the Melton et al. U.S. Pat. No. 3,010,733; the Thomas U.S. Pat. No. 3,094,376; the McCutchen U.S. Pat. No. 3,220,786; the Voaden U.S. Pat. No. 3,957,939; and Cooper et al. U.S. Pat. No. 4,238,039. Attention is also directed to German Patent 1,575,362; German Patent 1,961,946; Great Britain Patent 1,359,215; and Netherlands Patent 7412640.

SUMMARY OF THE INVENTION

The invention provides a sprocket assembly which is adapted to be supported on a shaft having a longitudinal axis. The sprocket assembly includes a polymeric sleeve adapted to be mounted on the axially extending shaft, the sleeve including a low friction bearing surface. The sprocket assembly further includes a polymeric sprocket wheel adapted to be mounted on the bearing surface of the polymeric sleeve for rotation relative to the sleeve about the longitudinal axis of the shaft.

In one aspect of the invention, the low friction bearing surface of the sleeve is formed of ultra-high molecular weight polyethylene.

In another aspect of the invention, seals are provided to inhibit the introduction of grit between the polymeric sleeve and the sprocket wheel.

In another aspect of the invention, a method is provided for forming a section of a sleeve adapted to be mounted on an axially extending shaft, which sleeve has two ends with respect to the axis, and wherein a flange is defined at each of the ends. First, a mold is provided having axially aligned, recessed areas for the flanges, which areas are semi-circular in cross section, and an intermediate axially extending generally semi-circular recessed area extending between the areas for the flanges. Next, a thin strip of polyethylene is placed in the intermediate axially extending recessed area such that the strip assumes the generally semi-circular cross sectional shape of the intermediate axially extending recessed area, such that the strip extends at least partially into each of the areas of the flanges, and such that a new recessed area is defined radially interiorly to the thin strip. Next, heated polyurethane is poured into the mold to fill the recessed areas for the flanges and to fill the recessed area radially interior to the thin strip, thereby encapsulating the thin strip in polyurethane in the flange areas.

Other features and advantages of the invention will become apparent to those skilled in the art upon review of the following detailed description of the preferred embodiment of the invention, reference being made to the attached drawings.

BRIEF DESCRIPTION OF THE VIEWS OF THE DRAWINGS

FIG. 1 is a longitudinal sectional view of a wastewater treatment settling tank embodying the invention.

FIG. 2 is an exploded perspective view of a polymeric sprocket assembly shown in FIG. 1.

DESCRIPTION OF THE PREFERRED EMBODIMENT OF THE INVENTION

Figure 3:
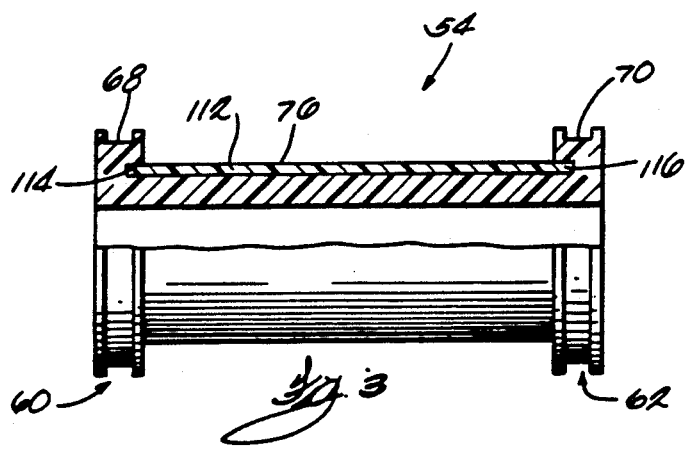
FIG. 3 is a front elevation view, partially in section, of the generally cylindrical sleeve of the sprocket assembly shown in FIG. 2.

FIG. 1 illustrates a wastewater treatment settling facility 11. The wastewater treatment settling facility comprises reinforced concrete walls defining a wastewater settling tank 13. A conduit 15 delivers wastewater into the tank 13 against a baffle 17 provided to minimize turbulence in the settling tank 13. Wastewater flows from an influent end 19 of the settling tank 13 to an effluent end 21 of the settling tank 13. One or more box weirs 23 are provided at the effluent end of the settling tank 13 and define transverse channels for flow of liquid out of the settling tank 13.

During flow of the liquid from the influent end 19 to the effluent end 21 of the settling tank 13, settleable waste or sludge tends to settle at the bottom 25 of the settling tank 13, while floatable waste or scum tends to rise to the top 27 of the settling tank 13. A sludge collector system 29 operates in the settling tank 13 to facilitate the removal of floating waste and settled waste from within the tank 13.

The sludge collector system 29 comprises a plurality of flights 31 driven by a chain drive system 33 which includes chains 35 (one shown) supporting the flights 31 for movement, and a plurality of pairs of sprocket assemblies 50 guiding the chains 35, which assemblies are mounted on shafts 52. A baffle 37 is provided at the top 27 of the settling tank 13, proximate the effluent end 21, to limit travel of floatable waste, which is guided from the influent end 19 to the effluent end 21 by the flights 31, so that the floatable waste can be collected in a collecting trough 39 and discharged from the settling tank 13. Similarly, a sludge trough 41 is provided at the bottom of the settling tank 13 proximate the influent end 19, where settleable solids are deposited by the flights 31. Sludge is pumped from the sludge trough 41 to remove it from the settling tank 13. Sludge collector systems are discussed in more detail in U.S. Pat. No. 4,631,974, Wiegand et al., the specification of which is incorporated herein by reference.

Figure 4:
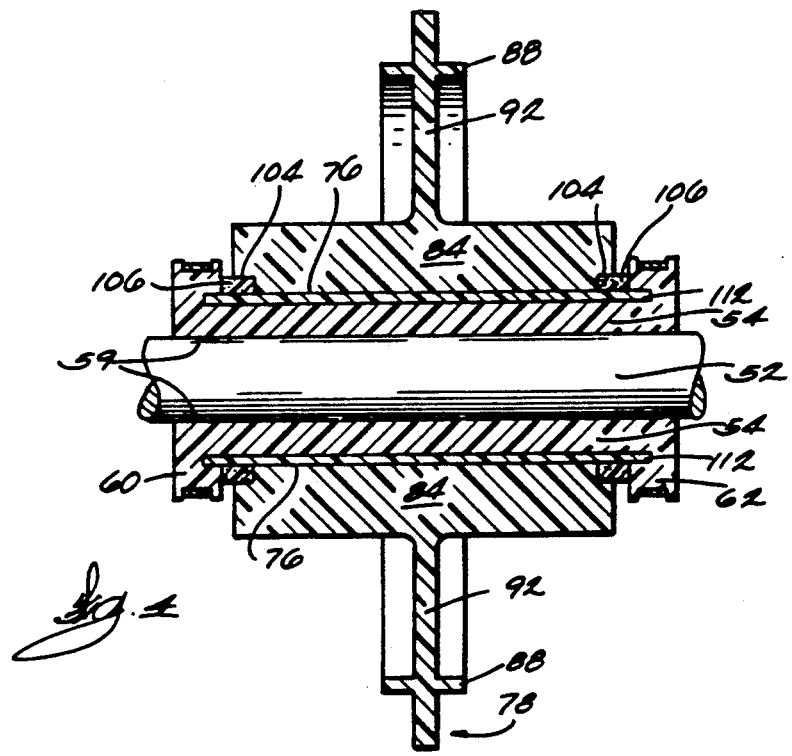
FIG. 4 is a sectional front elevation view of the sprocket assembly of FIG. 2, shown mounted on a shaft.

Referring now to FIGS. 2 and 4, one of the sprocket assemblies 50 will be discussed in further detail. Each sprocket assembly 50 comprises a polymeric sleeve 54 which is generally cylindrical in shape, and which has a first end 56, a second end 58, an intermediate bearing surface 76, preferably formed of polyethylene, and an inner cylindrical surface 59. A first flange 60 is defined at the first end 56 of the polymeric sleeve 54, and a second flange 62 is defined at the second end 58 of the polymeric sleeve 54. Further, the polymeric sleeve is split diametrically to define a first section 64 and a second section 66. A circumferential groove 68 is formed in the first flange 60, and a circumferential groove 70 is formed in the second flange 62. The circumferential grooves 68 and 70 are adapted to house clamps 72 and 74, respectively, which secure the first section 64 and the second section 66 to the shaft 52 in fixed relation as a complete polymeric sleeve 54. The polymeric sleeve 54 of the preferred embodiment of the invention is generally comprised of polyurethane, with a thin layer of ultra high molecular weight polyethylene polymerized to the polyurethane to form the low friction bearing surface 76; however, it is envisioned that the polymeric sleeve 54 could be completely formed of ultra high molecular weight polyethylene at increased expense.

The sprocket assembly 50 further includes a sprocket wheel 78 which is adapted to be mounted onto the bearing surface 76 of the sleeve 54 between the flanges 68 and 70, and which is split to define a first generally semi-circular section 80, and a second generally semi-circular section 82. The generally semi-circular sections 80 and 82 include hub portions 84 and 86, respectively, and outer rim portions 88 and 90, respectively. A plurality of spokes 92 extend radially between the hub portion 84 and the outer rim portion 88, and a plurality of spokes 94 extend radially between the hub portion 86 and the outer rim portion 90. A plurality of teeth 96 are disposed radially outwardly from the rim portions 88 and 90 to engage one of the chains 35.

After the polymeric sleeve 54 is secured to the shaft 52, the generally semi-circular sections 80 and 82 of the sprocket wheel 78 can be mounted to the bearing surface 76 of the polymeric sleeve 54, between the flanges 60 and 62, for rotation of the sprocket wheel 78 relative to the polymeric sleeve 54. Two of the spokes 92 of the first generally semi-circular section 80 are adapted to mate with two of the spokes 94 of the second generally semi-circular section 82 of the sprocket wheel 78. Slots 98 and recesses 100 are provided in two of the spokes 92 and two of the spokes 94 to receive "wedge dog" connectors 102 that secure the first generally semi-circular section 80 to the second generally semi-circular section 82 to form a complete sprocket wheel 78. Wedge dog connectors are described in detail in U.S. Pat. No. 4,631,974, Wiegand et al.

The hub section 84 of the first generally semi-circular section 80 of the sprocket wheel 78 includes arcuately formed seats 104 for supporting a plurality of strip seal portions 106. Similarly, the hub section 86 of the second generally semi-circular section 82 of the sprocket wheel 78 includes arcuately formed seats 108 for supporting a plurality of strip seal portions 110. In the preferred embodiment, the strip seal portions 106 and 110 are comprised of polyethylene foam. When the first generally semi-circular section 80 is secured to the second generally semi-circular section 82 to form a complete sprocket wheel 78, the strip seal portions 106 together with the strip seal portions 110 form ring seals which inhibit the introduction of grit and dirt between the bearing surface 76 of the polymeric sleeve 54 and the sprocket wheel 78, yet allow the introduction of lubricating water. In the preferred embodiment of the invention, the strip seal portions 106 and 110 comprise high molecular weight closed-cell polyethylene foam.

The strip seal portions 106 and 110 of the preferred embodiment each include a surface having adhesive thereon to allow the strip seal portions to be attached to the hub portions 84 and 86 of the sprocket wheel 78 for rotation with the hub portions 84 and 86, as the sprocket wheel 78 rotates about the polymeric sleeve 54.

Referring now to FIG. 3, it can be seen that the bearing surface 76 of the polymeric sleeve 54 of the preferred embodiment is defined by an insert 112 which is formed in the general shape of an open ended cylinder, and which has ends 114 and 116 which extend into the flanges 60 and 62, respectively. The insert 112 of the preferred embodiment is formed of a 1/16 inch thick ultra-high molecular weight polyethylene material that is polymerized to urethane, of which the sleeve 54 is otherwise formed.

Referring now to FIG. 4, the sleeve 54 can be seen, in section, mounted to the shaft 52, and the sprocket wheel 78 can be seen, in section, mounted to the sleeve 54 for rotation relative to the sleeve 54. The seal portions 106 and 110 (see FIG. 2) of the preferred embodiment abut the flanges 60 and 62 when the sprocket wheel 78 is mounted to the sleeve 54, and the hub portions 84 and 86 (see FIG. 2) of the preferred embodiment are slightly axially spaced from the flanges 60 and 62.

Figure 5:
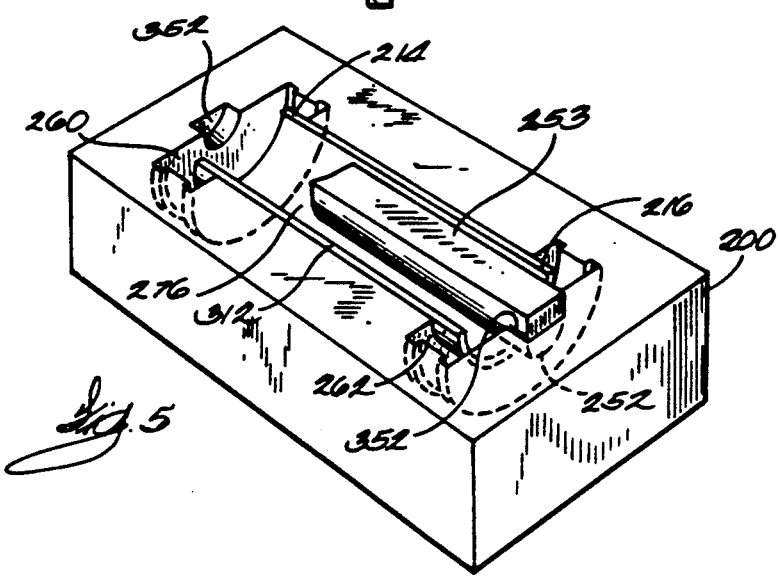
FIG. 5 is a perspective view of a mold illustrating a method of manufacturing the sleeve shown in FIG. 4.

Referring now to FIG. 5, a method of manufacturing the polymeric sleeve 54 will be described. A mold 200 is first provided which has a recessed area 260, which is generally semi-circular in cross-section, and which is in the shape of a diametrically split flange 60; a recessed area 262, which is generally semi-circular in cross-section, which is in the shape of a diametrically split flange 62, and which is axially aligned with, and spaced from, the recessed area 260; and an intermediate recessed area 276 which generally extends between, and which is axially aligned with the recessed areas 260 and 262. The mold 200 is further adapted to support a portion 252 of a mandrel 253, which portion is semi-circular in cross section to define a portion of the inner cylindrical surface 59. More particularly, pockets 352 are provided in the mold 200, which pockets are axially aligned with, and extend from the recesses 260 and 262 in the axially outward direction.

Next, a thin strip 312 of polyethylene is placed in the intermediate area 276 such that the strip 312 assumes the generally semi-circular cross sectional shape of the intermediate area 276, such that portions 214 and 216 of the strip 312 extend at least partially into the recessed areas 260 and 262, and such that a new recessed area is defined radially interiorly to the thin strip with a generally semi-circular cross-sectional shape.

Next, the semi-circular portion 252 of the mandrel 253 is positioned to be supported by the pockets 352.

Next, heated polyurethane is poured into the mold to fill the recessed areas 260 and 262, and the recessed area radially interior to the thin strip 312, thereby encapsulating the thin strip 312 in polyurethane in the recessed areas 260 and 262.

Heated polyurethane is poured into the mold until an overflow condition results, thereby resulting in the formation of a roughly formed, generally planar surface.

After cooling, a work product will be defined in the mold. Upon removal, the roughly formed generally planar surface of the work product is machined to create a smooth planar surface. When the machined work product is mated with a second machined work product, a polymeric sleeve 54 is defined, with the two thin strips 312 defining an insert 112.

In the preferred embodiment of the invention, the step of placing the thin strip 312 in the intermediate area 276 comprises the steps of providing a generally rectangular strip of ultra high molecular weight polyethylene; and pressing the rectangular strip into the axially extending recessed area 276 thereby causing it to assume the generally semi-circular shape.

While a preferred embodiment of the invention has been set forth as an example, it should be understood that various obvious modifications will become apparent to those of ordinary skill in the art. For example, the sprocket assembly can find application in an environment other than in a wastewater treatment settling facility. The polymeric sleeve could be formed as a single piece, as could the sprocket wheel. Thus, the scope of the invention should be limited only by the spirit and scope of the accompanying claims.

We claim:

1. A method of forming a section of a sleeve for a sprocket assembly of the type having a sleeve adapted to be mounted on an axially extending shaft having an axis and which is diametrically split into a first section and a second section, the sleeve having a first end and a second end, with respect to the axis, wherein a flange is defined at each of the first end and the second end of the sleeve and the sprocket assembly further including a sprocket wheel adapted to be mounted on the sleeve for rotation relative to the sleeve, said method comprising the steps of:

providing a mold having axially aligned recessed areas for the flanges, which areas are semi-circular in cross section, and an intermediate axially extending generally semi-circular recessed area extending between the areas for the flanges, the intermediate axially extending area having a smaller radius than the areas for the flanges;

placing a thin strip of polyethylene in the intermediate axially extending recessed area such that the strip assumes the generally semi-circular cross sectional shape of the intermediate axially extending recessed area, such that the strip extends at least partially into each of the areas of the flanges, and such that a new recessed area is defined radially interiorly to the thin strip; and pouring heated polyurethane into the mold to fill the recessed areas for the flanges and to fill the recessed area radially interior to the thin strip, thereby encapsulating the thin strip in polyurethane in the flange areas.

2. A method in accordance with claim 1 wherein the step of placing a thin strip in the axially extending recessed area comprises the steps of:

providing a generally rectangular strip of ultra high molecular weight polyethylene; and heating the rectangular strip and pressing the rectangular strip into the axially extending recessed area, thereby causing it to assume the generally semi-circular shape.

* * * * *